United States Patent [19]

Johansson et al.

[11] Patent Number: 5,051,284

[45] Date of Patent: Sep. 24, 1991

[54] PROTECTIVE WRAPPING OF FILM

[75] Inventors: Tor Johansson, Pori; Per Nyman, Ulvila, both of Finland

[73] Assignee: Rosenlew-Pakkaus Oy, Finland

[21] Appl. No.: 249,368

[22] Filed: Sep. 23, 1988

[30] Foreign Application Priority Data

Jan. 27, 1988 [FI] Finland .................................. 880374

[51] Int. Cl.$^5$ .............................................. B65B 53/00
[52] U.S. Cl. .................................. 428/34.9; 428/412; 428/423.1; 428/424.2; 428/483; 428/473.5; 428/516; 428/519
[58] Field of Search ...................... 428/34.9, 349, 517, 428/412, 423.1, 424.2, 483, 473.5, 516, 519

[56] References Cited

FOREIGN PATENT DOCUMENTS 1591423 6/1981 United Kingdom .

Primary Examiner—Edith L. Buffalow
Attorney, Agent, or Firm—Steinberg & Raskin

[57] ABSTRACT

A shrinkable protective wrapping or film for protecting products, especially packages. One surface of the protective wrapping or film is formed of conventional shrinking plastic material, while the other surface of the protective wrapping or film is formed of amorphous plastic material or a mixture of amorphous plastic material and polymer which, when being shrunk, does not adhere to the products being protected.

9 Claims, 1 Drawing Sheet

PROTECTIVE WRAPPING OF FILM

BACKGROUND OF THE INVENTION

The present invention relates to a shrinking protective wrapping or film for protecting products, especially packages.

Protective wrappings or films are used for so-called bundle package lots such as bundle bags or sacks and similar packaging, as well as for pallet loads in order to protect packages. When protecting packages by means of, for instance, protective wrapping which is shrunk around the packages with a conventional technique such as heat-sealing which is the equivalent of heating and radiation sealing or radiation heating, in the currently used protective wrappings the inner surface thereof sticks to the packages being protected. The packages might easily be damaged when removing the protective wrapping later.

Efforts have previously been made to eliminate the above-noted problems by, for instance, placing a sheet of paper between the package and the protective wrapping which prevents the protective wrapping from sticking to the package. Another known solution is the so-called double wrapping arrangement in which the inner wrapping does not stick to the packages because it does not shrink under normal conditions. In this arrangement, the outer wrapping is conventional shrinking protective wrapping.

A drawback of both these arrangements is the complicated packaging method which is also uneconomical from the point of view of material consumption and the working time used in the packaging operation.

An arrangement is also known in which materials are selected either for the protective wrapping or the plastic bags being packaged, so that either the density of the protective wrapping material is smaller than the density of the plastic bag material, or the density of the plastic bag material is smaller than the density of the material of the protective wrapping. Even this type of solution has the drawback that the materials may stick together, despite the different densities thereof.

An arrangement is also known in which the protective wrapping is made of so-called combination film. The inner surface of this kind of combination film is, for instance, polypropylene. A drawback of this prior art solution is difficulty in carrying out and controlling the shrinking operation.

SUMMARY OF THE INVENTION SUMMARY

Accordingly, it is an object of the present invention to provide improvement over previously-known shrinking protective wrapping and film arrangements.

It is a more detailed object of the present invention to provide a shrinking protective wrapping or film in which sticking of the protective wrapping or film to the products being protected, such as packages, or to the conventional protective wrapping surrounding a bundled package, is reliably prevented.

These and other objects are attained by the present invention which is directed to a protective wrapping or film for protecting a product or a package, comprising a sheet material having two surface layers. One surface layer is formed of shrinkable plastic material. The other surface layer is formed of amorphous plastic material, different from the shrinkable plastic material. The amorphous plastic material, when being shrunk, does not adhere to a product being protected or to any protective covering surrounding a bundled package.

The present invention is also directed to a protective wrapping or film for protecting a product or a package, comprising a sheet material having a single layer formed of amorphous plastic material which, when being shrunk, does not adhere to a product being protected or to any protective covering surrounding a bundled package. The layer of amorphous plastic material may be additionally formed of a mixture of said amorphous plastic material and polymer.

Thus, the objects of the present invention are attained with a shrinking protective wrapping or film having a principal characteristic feature that one surface of the protective wrapping or film is conventional shrinking plastic material, and the other surface of the protective wrapping is amorphous plastic material or a mixture of amorphous plastic material and polymer which, when being shrunk, does not stick to the products being protected or to conventional protective wrapping surrounding the bundled package. Alternatively, the protective wrapping or protective film may be a single-layer film made of amorphous plastic material, or of a mixture of amorphous plastic material and polymer.

In an advantageous embodiment of the present invention, the percentage of amorphous plastic material (in the mixture with the polymer) is about 50% to 100%, preferably about 70% to 100% (all percentages are based on weight unless otherwise noted herein).

The amorphous plastic material may be at least one of the following amorphous polymers: polyamide, polycarbonate, polymethyl methacrylate, polystyrene, polyvinyl chloride, polyisobutene, polypropene (atactic), polyethylene terephthalate, polyurethane, acrylic nitrile butadiene styrene, acrylic nitrile styrene acrylate, polyethere imide, polysulphone, polyacrylate, etc. It should be noted that polyethylene terephthalate polymer may be either amorphous or non-amorphous.

In some applications it has been noted that polystyrene and its mixtures are especially favorable. One preferred amorphous mixture comprises about 75% polystyrene and about 25% butadiene. Otherwise, most polyolefins can be mixed with the amorphous plastic material in accordance with the present invention.

A shrinking protective wrapping or film in accordance with the present invention may be either a single-layer film or a multi-layer film.

BRIEF DESCRIPTION OF THE DRAWINGS

The present invention will now be described in greater detail with reference to exemplary embodiments illustrated in the accompanying figures, and to which the present invention is not intended to be restricted. In the drawings.

DESCRIPTION OF THE PREFERRED EMBODIMENTS

Figure 1:
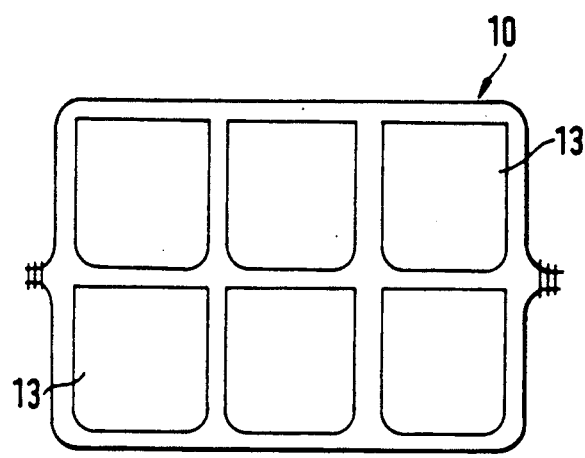
FIG. 1 is a schematic illustration of a preferred embodiment of a shrinkable protective wrapping in accordance with the present invention, utilized to protect a bundle package composed of bags or sacks.
Figure 2:
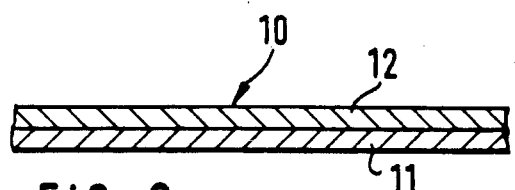
FIG. 2 is a sectional view of a preferred embodiment of material for the shrinkable protective wrapping utilized in FIG. 1.

In an embodiment illustrated in FIGS. 1 and 2, a shrinkable or shrinking protective wrapping in accordance with the present invention is generally denoted by reference numeral 10. In this illustrated embodiment, the products 13 to be protected, such as, for example, bags or sacks, constitute a so-called bundled package. The bags 13 are protected with a shrinking or shrinkable protective wrapping 10 in accordance with the present invention, such wrapping being shrunk by conventional technique. One surface of the protective wrapping 10, namely the outer surface 12 in this embodiment, is composed of conventional shrinking plastic material (films made from either virgin LDPE (low density PE) or MDPE (medium density PE)), while the other surface in this embodiment, namely an inner surface 11, is composed of amorphous plastic material or a mixture of amorphous plastic material and polymer which, when being shrunk, does not stick to the packages 13 being protected.

Figure 3:
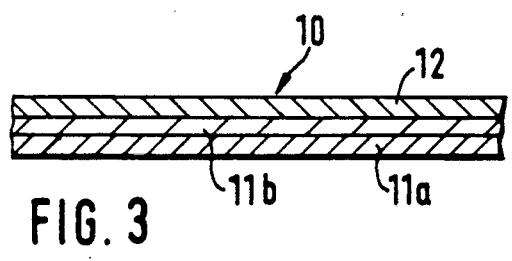
FIG. 3 is a sectional view of another preferred embodiment of a shrinkable protective wrapping used in FIG. 1.

The embodiment illustrated in FIG. 3 is otherwise similar to the embodiment illustrated in FIGS. 1 and 2, with the exception that the protective wrapping 10 comprises a three-layer film in which the outer surface 12 is conventional shrinking plastic material, the inner surface 11a is amorphous plastic material or a mixture of the amorphous plastic material and polymer which, when shrinking, does not adhere to packages 13 being protected therein, and in which an intermediate layer 11b can be formed of any plastic material. Preferably, the intermediate layer 11b is different from the composition of the outer layers 11a and 12.

Figure 4:
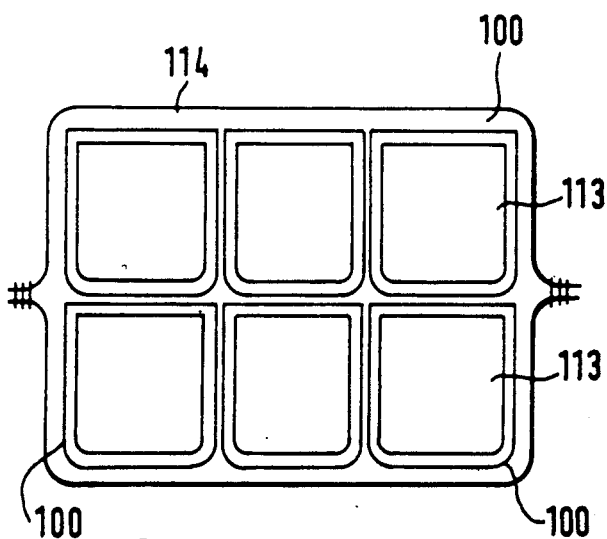
FIG. 4 is a schematic illustration of a bundled package in which the products are packaged in a shrinkable protective wrapping in accordance with the present invention, and the bundled package is additionally protected with conventional protective wrapping.
Figure 5:
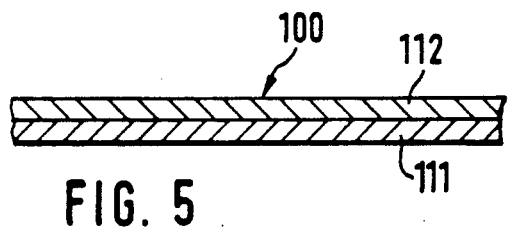
FIG. 5 is a sectional view of a preferred embodiment of the shrinkable protective wrapping material utilized in FIG. 4.

In the embodiments illustrated in FIGS. 4 and 5, the products being protected such as bottles 113 utilized in the pharamaceutical industry, are protected in accordance with the present invention by shrinking protective films 100. The products 113 protected by protective films 100 comprise a so-called bundled package which is surrounded by a conventional protective wrapping 114. In this embodiment, the inner surface 111 of the protective film 100 is formed of conventional shrinkable plastic material (e.g. normal polyethylene), while the outer surface 112 is formed of amorphous plastic material or a mixture of said amorphous plastic material and polymer which, when shrinking, does not adhere to the conventional protective wrapping 114 surrounding the bundled package.

Layers 11, 12 (FIG. 2), layers 12, 11a, 11b (FIG. 3), and layers 111, 112 (FIG. 5) always adhere to one another. The layers are matched so that a good ply-bond strength is obtained. More specifically, layer 11 adheres directly to layer 12 in the embodiment of FIG. 2, however layer 11a requires a tie-layer 11b for bonding to layer 12 in the embodiment of FIG. 3. In other words, layer 11a cannot be directly bonded to layer 12.

Figure 6:
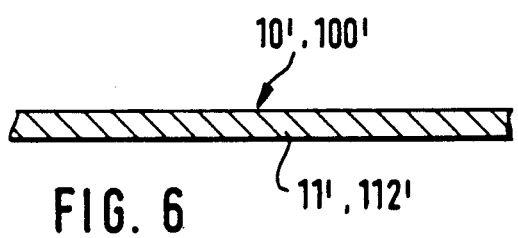
FIG. 6 is a sectional view of an alternative preferred embodiment of the shrinkable protective wrapping illustrated in FIG. 1, or the shrinkable protective film material utilized in FIG. 4.

The embodiment shown in FIG. 6 is otherwise similar to the embodiment illustrated in FIGS. 1 and 2, with the exception that the protective wrapping 10' is constituted by a single-layer film 11' which is formed of the amorphous plastic material or of a mixture of the amorphous plastic material and polymer which, when shrinking, does not adhere to packages being protected. The single-layer film 112' illustrated in FIG. 6 may naturally be used in the protective film utilized in the embodiment in accordance with FIG. 4 as the protective film 100' which is composed of the single-layer film 112'.

Only a few preferred embodiments of the present invention have been described above, and it is readily understood that the same can be modified in many ways in accordance with the inventive concepts set forth above. Therefore, the preceding description of the present invention is merely exemplary, and is not intended to limit the scope thereof in any way.

We claim:

1. Protective wrapping or film for protecting a product or package, comprising a sheet material having two surface layers, one surface layer formed of shrinkable plastic material, and the other surface layer formed of amorphous plastic material is selected from at least one of polyamide, polycarbonate, polymethyl methacrylate, polystyrene, polyvinyl chloride, polyisobutene, polypropene amorphous polyethylene terephthalate, polyurethane, acrylic nitrile butadiene styrene, acrylic nitrile styrene acrylate, polyetherimide, polysulfone, and polyacrylate different from said shrinkable plastic material, said other surface layer being the layer which contacts the product or any protective coating covering a bundled package wherein said amorphous plastic material, when being shrunk, does not adhere to the product being protected or to any protective covering surrounding a bundled package.

2. The combination of claim 1, wherein said other surface layer is formed of a mixture of said amorphous plastic material and polyolefine.

3. The combination of claim 2, wherein percentage of said amorphous plastic material in said mixture is about 50 to 100%.

4. The combination of claim 3, wherein said percentage is about 70 to 100%.

5. The combination of claim 2, wherein said mixture is polystyrene and butadiene.

6. The combination of claim 5, wherein said mixture comprises about 75% polystyrene and about 25% butadiene.

7. The combination of claim 1, wherein said one surface layer is an outer layer and said other surface layer is an inner layer.

8. The combination of claim 7, additionally comprising an intermediate layer between said outer and inner layers and formed of plastic material different from said inner and outer layers.

9. The combination of claim 7, additionally comprising a protective covering surrounding said outer layer and forming a package.

* * * * *